US012167518B2

United States Patent
Ichikawa et al.

(10) Patent No.: US 12,167,518 B2
(45) Date of Patent: Dec. 10, 2024

(54) LIGHT SOURCE MODULE AND LIGHTING CIRCUIT

(71) Applicant: KOITO MANUFACTURING CO., LTD., Tokyo (JP)

(72) Inventors: Tomoyuki Ichikawa, Shizuoka (JP); Toru Ito, Shizuoka (JP); Atsushi Ozawa, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 76 days.

(21) Appl. No.: 18/063,810

(22) Filed: Dec. 9, 2022

(65) Prior Publication Data
US 2023/0104593 A1 Apr. 6, 2023

Related U.S. Application Data

(63) Continuation of application No. PCT/JP2021/021726, filed on Jun. 8, 2021.

(30) Foreign Application Priority Data

Jun. 12, 2020 (JP) .................. 2020-102589

(51) Int. Cl.
*H05B 45/30* (2020.01)
*B60Q 1/14* (2006.01)
(Continued)

(52) U.S. Cl.
CPC ........... *H05B 45/44* (2020.01); *B60Q 1/1423* (2013.01); *H05B 45/345* (2020.01); *B60Q 2300/05* (2013.01)

(58) Field of Classification Search
CPC ...... H05B 45/10; H05B 45/30; H05B 45/345; H05B 45/44; H05B 47/10; B60Q 1/1423; B60Q 2300/05
See application file for complete search history.

(56) References Cited

U.S. PATENT DOCUMENTS

| | | | |
|---|---|---|---|
| 2015/0264754 A1* | 9/2015 | Ito ...................... | H05B 45/3725 315/83 |
| 2018/0339641 A1* | 11/2018 | Matsui ................. | H05B 45/375 |
| 2020/0187329 A1* | 6/2020 | Ichikawa ............. | H05B 45/345 |

FOREIGN PATENT DOCUMENTS

| | | |
|---|---|---|
| JP | 2016197711 A | 11/2016 |
| JP | 2018198173 A | 12/2018 |

OTHER PUBLICATIONS

International Preliminary Report on Patentability (PCT/IB/373) with translation mailed on Dec. 13, 2022, by the International Bureau of WIPO on behalf of the International Searching Authority for International Application No. PCT/JP2021/021726. 10 Pages.

(Continued)

*Primary Examiner* — Jimmy T Vu

(74) *Attorney, Agent, or Firm* — Buchanan Ingersoll & Rooney PC

(57) ABSTRACT

A first light emitting unit includes M (M≥2) first light emitting elements provided in series. A second light emitting unit including N (N<M) second light emitting elements and a switching transistor are provided on a path parallel to the first light emitting unit. A constant-current driver is connected in series to both the first light emitting unit and the second light emitting unit, and generates a drive current. A drive circuit includes a capacitor provided between a gate and a drain of the switching transistor, and causes the gate of the switching transistor to generate a drive signal according to a switching signal.

11 Claims, 5 Drawing Sheets

(51) Int. Cl.
*H05B 45/345* (2020.01)
*H05B 45/44* (2020.01)

(56) References Cited

OTHER PUBLICATIONS

International Search Report (PCT/ISA/210) with translation mailed on Jul. 13, 2021, by the Japan Patent Office as the International Searching Authority for International Application No. PCT/JP2021/021726. 5 pages.

* cited by examiner

LIGHT SOURCE MODULE AND LIGHTING CIRCUIT

BACKGROUND

1. Technical Field

The present disclosure relates to a light source module used in an automobile or the like.

2. Description of the Related Art

A vehicle lamp (for example, a headlight) has a plurality of functions such as a high beam, a low beam, a clearance lamp (position lamp), and a daytime running lamp (DRL).

FIG. 1 is a block diagram of a lamp system 1R including a conventional vehicle lamp 10R. FIG. 1 illustrates blocks associated with a low beam and a high beam. The vehicle lamp 10R receives a DC voltage (input voltage $V_{IN}$) from a battery 2 via a switch 4, and lights a light source 12L for low beam and a light source 12H for high beam, using the input voltage $V_{IN}$ as a power source. Each of the light sources 12H and 12L includes a plurality of light emitting elements (for example, LEDs) provided in series (or in parallel).

The vehicle lamp 10R includes a lighting circuit 14L for low beam and a lighting circuit 14H for high beam. An H/L switching signal for switching between high beam and low beam is input to the vehicle lamp 10R. When the input voltage $V_{IN}$ is supplied, the lighting circuit 14L supplies a drive current $I_{LED1}$ to the light source 12L and lights it up.

The lighting circuit 14H is switched between enable (active, on) and disable (inactive, off) according to the H/L switching signal, supplies a drive current $I_{LED2}$ to the light source 12H in the enable state, and lights it.

The conventional vehicle lamp 10R has had the problem of large cost and size of the high beam and the low beam formed as independent circuits.

SUMMARY

The present disclosure has been made in view of such a problem, and an exemplary object of an aspect of the present disclosure is to provide a light source module capable of switching a plurality of functions.

One aspect of the present disclosure relates to a light source module. The light source module can switch between a first function and a second function according to a switching signal. The light source module includes: a first light emitting unit including M (M≥2) first light emitting elements provided in series; a second light emitting unit including N (N<M) second light emitting elements and a switching transistor having a drain or a collector connected to the second light emitting unit, wherein the second light emitting unit and the switching transistor are provided on a path parallel to the first light emitting unit; a constant-current driver connected in series to the first light emitting unit and in series to the second light emitting unit respectively and has a constant-current output for generating a drive current; and a drive circuit including a capacitor provided between a gate and a drain or between a base and a collector of the switching transistor and structured to generate a drive signal at the gate or the base of the switching transistor according to the switching signal.

One aspect of the present disclosure relates to a light source module. The light source module can switch between a first function and a second function according to a switching signal. The light source module includes: a first light emitting unit including S (S≥1) first light emitting elements and a first switching transistor having a drain or a collector connected to the first light emitting unit, wherein the first light emitting unit and the first switching transistor are provided on a first path; a second light emitting unit including S second light emitting elements and a second switching transistor having a drain or a collector connected to the second light emitting unit, wherein the second light emitting unit and the second switching transistor are provided on a second path parallel to the first path; a constant-current driver connected in series to the first path and in series to the second path respectively and having a constant-current output for generating a drive current; a first drive circuit including a first capacitor provided between a gate and a drain or between a base and a collector of the first switching transistor and structured to generate a first drive signal at the gate or the base of the first switching transistor according to a switch signal; and a second drive circuit including a second capacitor provided between a gate and a drain or between a base and a collector of the second switching transistor and structured to generate a second drive signal at the gate or the base of the second switching transistor according to the switching signal.

One aspect of the present disclosure relates to a lighting circuit. The lighting circuit is used in a light source module capable of switching between a first function and a second function according to a switching signal, and drives a light source. The light source includes M (M≥2) first light emitting elements provided in series on a first path, and N (N<M) second light emitting elements provided on a second path in parallel to the first path. The lighting circuit includes: a connection terminal connected to a cathode of the M second light emitting elements; a switching transistor provided between the connection terminal and a ground line; a constant-current driver connected in series to the first path and in series to the second path respectively and that has a constant-current output for generating a drive current; and a drive circuit including a capacitor provided between a control electrode of the switching transistor and the connection terminal and structured to generate a drive signal at the control electrode of the switching transistor according to the switching signal.

One aspect of the present disclosure relates to a lighting circuit. The lighting circuit is used in a light source module capable of switching between a first function and a second function according to a switching signal, and drives a light source. The light source includes S (S≥1) first light emitting elements provided on a first path and S second light emitting elements provided on a second path parallel to the first path. The lighting circuit includes: a first connection terminal connected to a cathode of the S first light emitting elements; a second connection terminal connected to a cathode of the S second light emitting elements; a first switching transistor provided between the first connection terminal and a ground line; a second switching transistor provided between the second connection terminal and the ground line; a constant-current driver that is connected in series to both the first path and the second path and that has a constant-current output for generating a drive current; a first drive circuit including a first capacitor provided between a control electrode of the first switching transistor and the first connection terminal and structured to supply a first drive signal according to the switch signal to the control electrode of the first switching transistor; and a second drive circuit including a second capacitor provided between the control electrode of the second switching transistor and the second connection terminal and structured to supply a second drive signal according to the switching signal to the control electrode of the second switching transistor.

It should be noted that any combination of the above components or any conversion of expressions of the present disclosure between methods, apparatuses, and the like is also effective as an aspect of the present invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION

Summary of Embodiments

Figure 1:
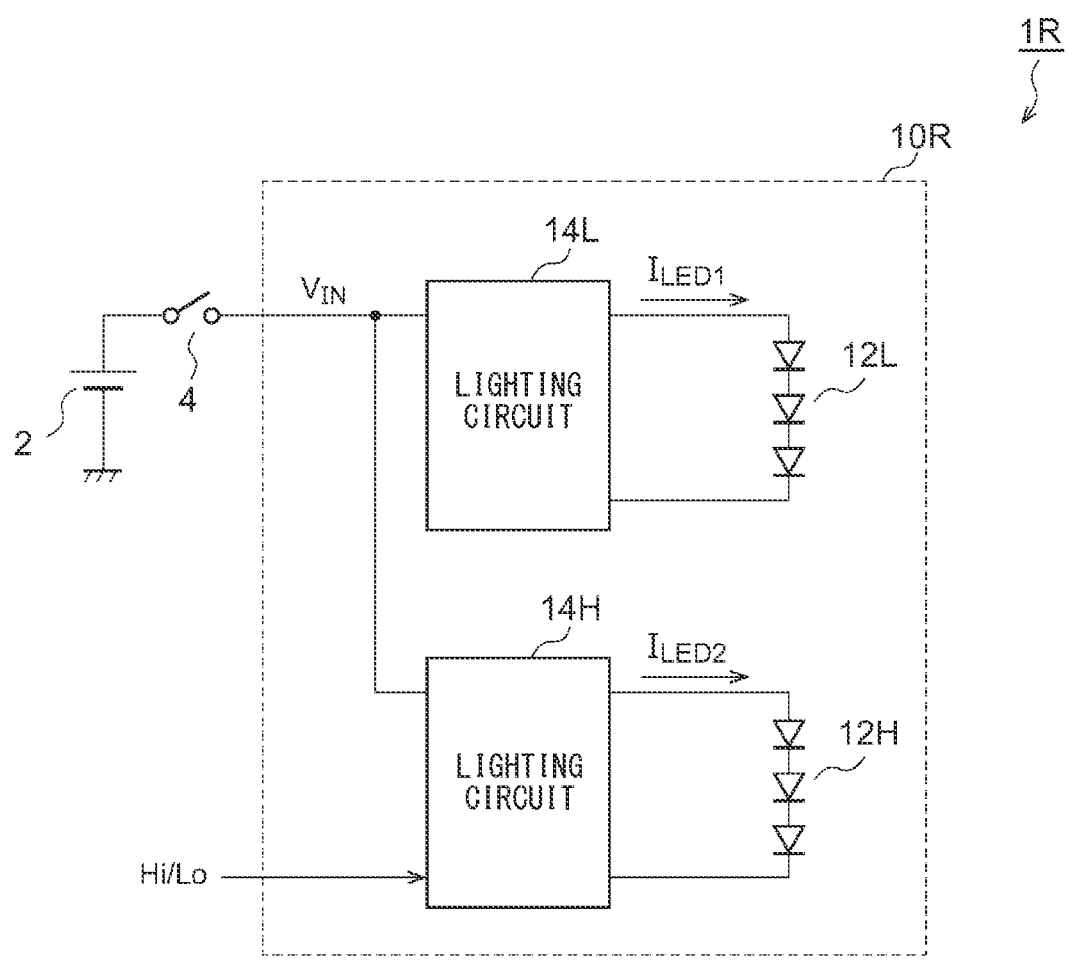
FIG. 1 is a block diagram of a lamp system including a conventional vehicle lamp.

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "one embodiment" may be used herein to refer to a single embodiment or multiple embodiments of the disclosure.

A light source module according to one embodiment can switch between a first function and a second function according to a switching signal. The light source module includes: a first light emitting unit including M (M≥2) first light emitting elements provided in series; a second light emitting unit including N (N<M) second light emitting elements and a switching transistor having a drain or a collector connected to the second light emitting unit, wherein the second light emitting unit and the switching transistor are provided on a path parallel to the first light emitting unit; a constant-current driver connected in series to the first light emitting unit and in series to the second light emitting unit respectively and has a constant-current output for generating a drive current; and a drive circuit including a capacitor provided between a gate and a drain or between a base and a collector of the switching transistor and structured to generate a drive signal at the gate or the base of the switching transistor according to the switching signal. (i) When the switching transistor is in a state of off, the drive current generated by the constant-current driver is supplied to the M first light emitting elements, so that the M first light emitting elements are lit, and the N second light emitting elements are unlit (first function). (ii) When the switching transistor is in a state of on, the drive current generated by the constant-current driver flows to the N second light emitting elements. When the voltage drop (forward voltage) of a single light emitting element is denoted by Vf, the voltage across the second path when the changeover switch is on is N×Vf, which is less than M×Vf, and therefore, the M first light emitting elements are not lit, and only the N second light emitting elements are lit (second function). Thus, two functions can be switched by one switching transistor.

At the time of switching between the first function and the second function, the capacitor of the drive circuit acts as mirror capacitance, and thus acts to extend the time required for turning on and off the switching transistor (referred to as a turn-on time and a turn-off time, respectively). As a result, the change rate of the voltage across the first path and the second path can be made gentle, which allows suppression of the unlit state due to an overcurrent or a voltage shortage at the time of switching between the first function and the second function.

In one embodiment, the drive circuit may be structured such that the turn-off time of the switching transistor is longer than the turn-on time of the switching transistor. As a result, the second light emitting element gently becomes unlit, and the lighting time of the second light emitting element can be overlapped with the lighting time of the first light emitting element, which can prevent them from being unlit simultaneously.

In one embodiment, the switching signal may be switchable between two states of high-level and high impedance. The drive circuit may include a first resistor provided between a control terminal to which a switching signal is input and a gate or a base of a switching transistor, and a second resistor provided between the gate and a source or between the base and an emitter of the switching transistor. As a result, the turn-off time of the switching transistor can be made longer than the turn-on time.

In one embodiment, a switching signal may be switchable between two states of high-level and low-level. The drive circuit may include a first resistor provided between a control terminal to which a switching signal is input and a gate or a base of the switching transistor, and a rectifier element and a second resistor provided in series on a path in parallel to the first resistor. As a result, the turn-off time of the switching transistor can be made longer than the turn-on time.

A light source module according to one embodiment can switch between a first function and a second function according to a switching signal. The light source module includes: a first light emitting unit including S (S≥1) first light emitting elements and a first switching transistor having a drain or a collector connected to the first light emitting unit, wherein the first light emitting unit and the first switching transistor are provided on a first path; a second light emitting unit including S second light emitting elements and a second switching transistor having a drain or a collector connected to the second light emitting unit, wherein the second light emitting unit and the second switching transistor are provided on a second path parallel to the first path; a constant-current driver connected in series to the first path and in series to the second path respectively and having a constant-current output for generating a drive current; a first drive circuit including a first capacitor provided between a gate and a drain or between a base and a collector of the first switching transistor and structured to generate a first drive signal at the gate or the base of the first switching transistor according to a switch signal; and a second drive circuit including a second capacitor provided between a gate and a drain or between a base and a collector of the second switching transistor and structured to generate a second drive signal at the gate or the base of the second switching transistor according to the switching signal.

(i) When the first switching transistor is in a state of on and the second switching transistor is in a state of off, the drive current generated by the constant-current driver is supplied to the S first light emitting elements, so that the S first light emitting elements are lit, and the S second light emitting elements are unlit (first function). (ii) When the first switching transistor is in a state of off and the second switching transistor is in a state of on, the drive current generated by the constant-current driver flows to the S second light emitting elements, and the S first light emitting elements are not lit, and only the S second light emitting elements are lit (second function). Thus, two functions can be switched by the two switching transistors.

At the time of switching between the first function and the second function, since the first capacitor and the second capacitor of the first drive circuit and the second drive circuit act as mirror capacitance, they act to extend the time required for turning on and off the switching transistor (referred to as turn-on time and turn-off time, respectively). As a result, the change rate of the voltage across the first path and the second path can be made gentle, which allows suppression of the unlit state due to an overcurrent or a voltage shortage at the time of switching between the first function and the second function.

The first drive circuit may be structured such that a turn-off time of the first switching transistor is longer than a turn-on time of the first switching transistor. The second drive circuit may be structured such that a turn-off time of the second switching transistor is longer than a turn-on time of the second switching transistor. As a result, the first light emitting element and the second light emitting element gently become unlit, and the lighting time of the second light emitting element can be overlapped with the lighting time of the first light emitting element, which can prevent them from being unlit simultaneously.

The switching signal may be switchable between two states of high-level and high impedance, and the first drive circuit and the second drive circuit may each include a first resistor provided between a control terminal to which the switching signal is input and the gate or the base of the switching transistor, and a second resistor provided between a gate and a source or between a base and an emitter of the switching transistor.

The switching signal may be switchable between two states of high-level and low-level, and the first drive circuit and the second drive circuit may include a first resistor provided between a control terminal to which a switching signal is input and a gate or a base of a switching transistor, and a rectifier element and a second resistor provided in series on a path in parallel to the first resistor.

A light source module according to one embodiment may further include a third light emitting unit including at least one third light emitting element provided on a path in series to the first light emitting unit and in series to the second light emitting unit respectively. The at least one third light emitting element can be lit in both the first function and the second function.

The first function may be a high beam and the second function may be a low beam.

The first function may be a daytime running lamp, and the second function may be a clearance lamp.

A lighting circuit according to one embodiment is used in a light source module capable of switching between a first function and a second function according to a switching signal, and drives a light source. The light source includes M (M≥2) first light emitting elements provided in series on a first path, and N (N<M) second light emitting elements provided on a second path in parallel to the first path. The lighting circuit includes: a connection terminal connected to a cathode of the M second light emitting elements; a switching transistor provided between the connection terminal and a ground line; a constant-current driver that is connected in series to the first path and in series to the second path respectively and that has a constant-current output for generating a drive current; and a drive circuit including a capacitor provided between a control electrode of the switching transistor and the connection terminal and structured to generate a drive signal at the control electrode of the switching transistor according to the switching signal.

A lighting circuit according to one embodiment is used in a light source module capable of switching between a first function and a second function according to a switching signal, and drives a light source. The light source includes S (S≥1) first light emitting elements provided on a first path and S second light emitting elements provided on a second path parallel to the first path. The lighting circuit includes: a first connection terminal connected to a cathode of the S first light emitting elements; a second connection terminal connected to a cathode of the S second light emitting elements; a first switching transistor provided between the first connection terminal and a ground line; a second switching transistor provided between the second connection terminal and the ground line; a constant-current driver connected in series to the first path and in series to the second path respectively and that has a constant-current output for generating a drive current; a first drive circuit including a first capacitor provided between a control electrode of the first switching transistor and the first connection terminal and structured to supply a first drive signal according to the switch signal to the control electrode of the first switching transistor; and a second drive circuit including a second capacitor provided between the control electrode of the second switching transistor and the second connection terminal and structured to supply a second drive signal according to the switching signal to the control electrode of the second switching transistor.

EMBODIMENTS

Description will be made below regarding preferred embodiments with reference to the drawings. The same or similar components, members, and processes are denoted by the same symbols, and redundant description thereof will be omitted as appropriate. The embodiments have been described for exemplary purposes only, and are by no means intended to restrict the present disclosure and the present invention. Also, it is not necessarily essential for the present disclosure and the present invention that all the features or a combination thereof be provided as described in the embodiments.

In the present specification, "a state in which the member A is connected to the member B" includes not only a case where the member A and the member B are physically and directly connected to each other, but also a case where the member A and the member B are indirectly connected to each other via another member which does not substantially affect their electrical connection state or which does not impair a function or an effect exhibited by their coupling.

Similarly, "a state in which the member C is provided between the member A and the member B" includes not only a case where the member A and the member C, or the member B and the member C are directly connected to each other, but also a case where the members are indirectly connected to each other via another member which does not substantially affect their electrical connection state or which does not impair a function or an effect exhibited by their coupling.

In addition, in the present specification, a sign attached to an electric signal such as a voltage signal and a current signal, or a circuit element such as a resistor and a capacitor represents a voltage value, a current value, a resistance value, or a capacitance value as necessary.

First Embodiment

Figure 2:
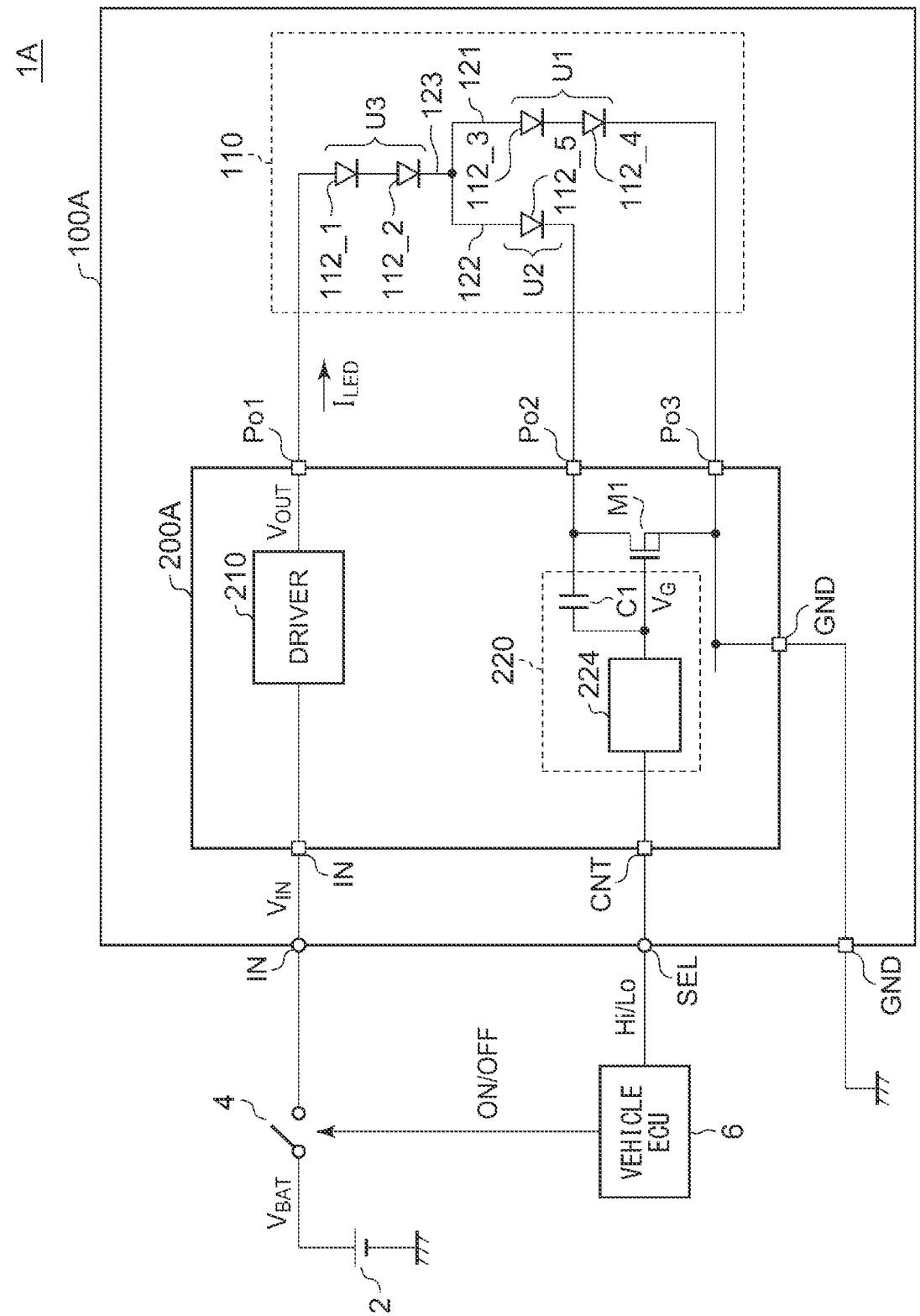
FIG. 2 is a block diagram of a lamp system including the light source module according to a first embodiment.

FIG. 2 is a block diagram of a lamp system 1A including a light source module 100A according to a first embodiment. The lamp system 1A includes a battery 2, a switch 4, a vehicle-side electronic control unit (ECU) 6, and a light source module 100A.

The light source module 100A has a first function and a second function among a plurality of functions of the vehicle lamp, and can switch between the first function and the second function. In the present embodiment, the vehicle lamp 10 is a headlight (headlamp), and the first function is a high beam and the second function is a low beam.

An input terminal IN of the light source module 100A is connected to the battery 2 through the switch 4. When the switch 4 is turned on depending on a lighting/lighting-out signal ON/OFF, an input voltage (also referred to as a power supply voltage) $V_{IN}$ corresponding to a battery voltage $V_{BAT}$ is supplied to the input terminal IN. The lighting/lighting-out signal ON/OFF may be generated by a vehicle-side ECU 6 or may be generated in conjunction with a switch in a cockpit. A ground terminal GND of the light source module 100A is grounded.

A switching signal Hi/Lo indicating the high beam and the low beam of the light source module 100A is supplied from the vehicle-side ECU 6 to a switching terminal SEL of the light source module 100A. The switching signal Hi/Lo is a signal that changes in two states.

The light source module 100A includes a light source 110 and a lighting circuit 200A, which are unitized, and a completed product of the light source module 100A is assembled to the vehicle lamp.

The light source 110 includes a first light emitting unit U1, a second light emitting unit U2, and a third light emitting unit U3. The first light emitting unit U1 includes M (M≥2) first light emitting elements 112_3, 112_4 provided in series on a first path 121. The second light emitting unit U2 includes N (N<M) second light emitting elements 112_5 provided on a second path 122 parallel to the first path 121. The third light emitting unit U3 includes L (L≥1) light emitting elements 112_1, 112_2 provided on a third path 123 in series with both the first path 121 and the second path 122. In this example, M=2, N=1, and L=2. The light emitting element is preferably a light emitting diode (LED), but other semiconductor light emitting elements such as a laser diode (LD) and an organic EL element may be used, for example.

The first light emitting unit U1 provides a first function, that is, forms a part of the light distribution of the high beam. The second light emitting unit U2 provides a second function, that is, forms a part of the light distribution of the low beam. The third light emitting unit U3 forms the light distribution common to the first function (high beam) and the second function (low beam).

The lighting circuit 200A includes a constant-current driver 210, a switching transistor M1, and a drive circuit 220. The lighting circuit 200A may be an application specific integrated circuit (ASIC) integrated on one semiconductor substrate, or may be configured with a discrete component.

The lighting circuit 200A includes an input terminal (or pin) IN, a control terminal CNT, a ground terminal GND, and connection terminals Po1 to Po3 of the light source 110. The input voltage $V_{IN}$ is supplied to the input terminal IN, and the ground terminal GND is grounded.

The switching signal Hi/Lo is input to the control terminal CNT. Corresponding terminals of the light source 110 are connected to the connection terminals Po1 to Po3.

The switching transistor M1 is provided in series with the N second light emitting elements 112_5 on the second path 122. The switching transistor M1 is an N-channel metal oxide semiconductor field effect Transistor (MOSFET), and the drain thereof is connected to the second light emitting unit U2. The switching transistor M1 may be an NPN bipolar transistor, and in that case, the collector thereof is connected to the second light emitting unit U2.

The constant-current driver 210 is a constant-current output driver that is connected in series to both the first path 121 and the second path 122 and that generates a drive current $I_{LED}$ stabilized to a predetermined target amount $I_{REF}$. The configuration of the constant-current driver 210 is not particularly limited, and may be a linear regulator of constant-current output, a switching converter of constant-current output (DC/DC converter), or a combination of a switching converter of constant-voltage output and a constant-current circuit.

The drive circuit 220 includes a capacitor C1. One end of the capacitor C1 is connected to a connection terminal Po2, in other words, the drain (or collector) of the switching transistor M1. The other end of the capacitor C1 is connected to the control electrode (that is, the gate or the base) of the switching transistor M1.

A drive signal generation circuit 224 of the drive circuit 220 causes the control electrode (gate or base) of the switching transistor M1 to generate a drive signal $V_G$ (gate signal or base signal) according to the switching signal Hi/Lo. Specifically, the drive signal $V_G$ is generated such that the switching transistor M1 is turned off when the switching signal Hi/Lo indicates the first function (high beam), and such that the switching transistor M1 is turned on when the switching signal Hi/Lo indicates the second function (low beam).

Figure 3:
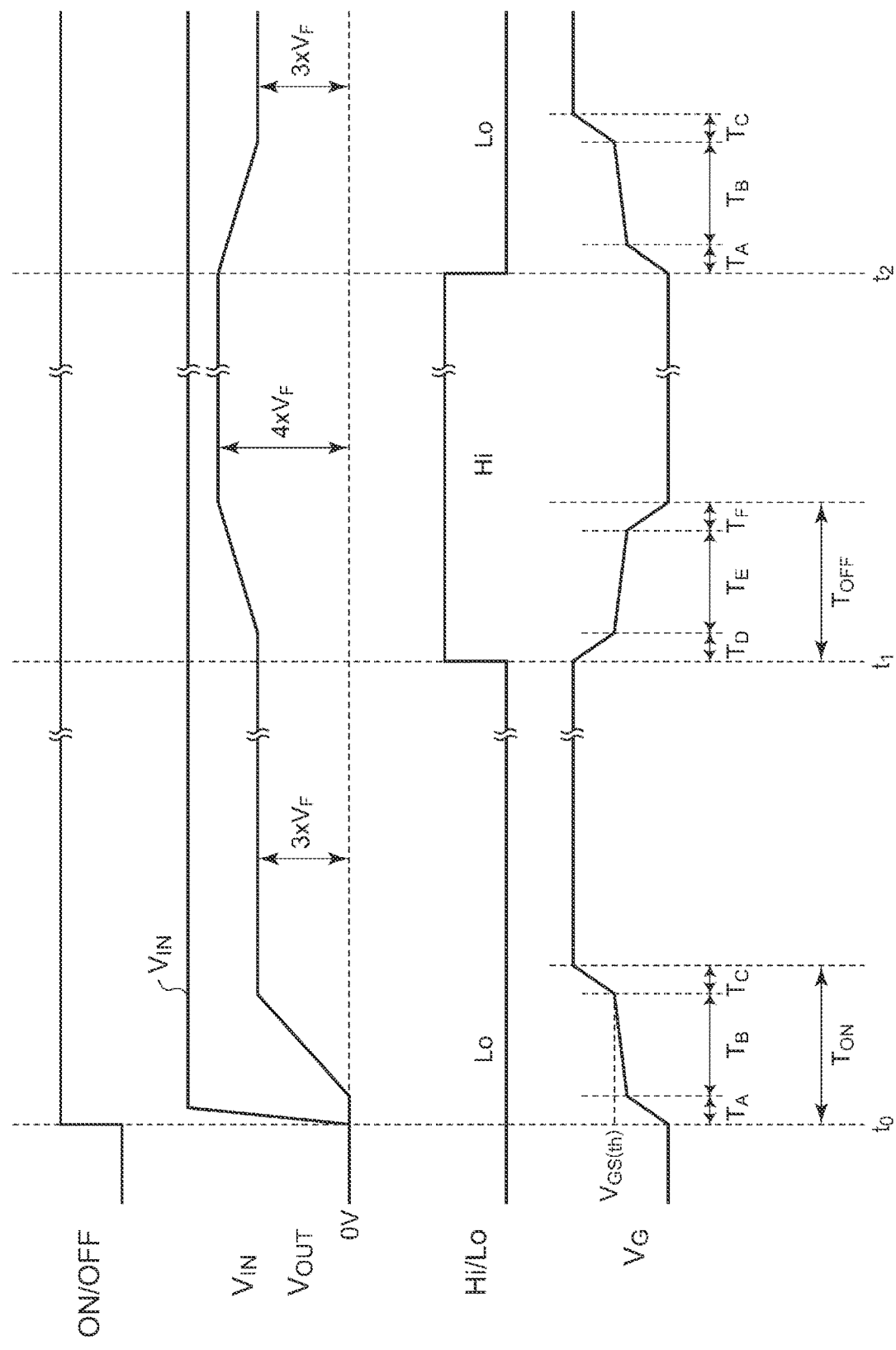
FIG. 3 is a diagram for explaining an operation of the light source module of FIG. 2.

The configuration of the light source module 100A has been described above. Next, its operation will be described. FIG. 3 is a diagram for explaining the operation of the light source module 100A of FIG. 2.

Before the time $t_0$, the lighting/lighting-out signal ON/OFF is at an off level, the switch 4 in FIG. 2 is off, and the light source module 100A is unlit. When the lighting/lighting-out signal ON/OFF transits to the on level at the time $t_0$, the switch 4 in FIG. 2 is turned on, a power supply voltage $V_{IN}$ is supplied to the light source module 100A, which becomes a lighting instruction.

At the time $t_0$, the switching signal Hi/Lo indicates the second function (low beam). When the input voltage $V_{IN}$ is supplied, the drive circuit 220 causes a gate signal $V_G$ of the switching transistor M1 to transition to high.

A turn-on operation period (turn-on period) $T_{ON}$ of the switching transistor M1 includes three sections $T_A$, $T_B$, and $T_C$. In the section $T_A$, the gate capacitance of the switching transistor M1 is charged by the drive circuit 220, and the gate voltage $V_G$ of the switching transistor M1 rises. In this section $T_A$, since the switching transistor M1 is off, the second light emitting unit U2 is not lit yet.

When the gate voltage $V_G$ rises to the vicinity of a gate-source threshold voltage $V_{GS(th)}$ of the switching transistor M1, the time enters into a section $T_B$. In the section $T_B$, a drain voltage $V_G$, of the switching transistor M1 rises in addition to the gate voltage $V_G$, but the rising speed of the gate voltage $V_G$ becomes very slow due to the mirror effect caused by the capacitor C1.

In the section $T_B$, the switching transistor M1 is slowly turned on. As a result, an output voltage $V_{OUT}$ of the constant-current driver 210 slowly rises from 0 V toward $3 \times V_F$.

When the gate voltage $V_G$ exceeds the threshold voltage $V_{GS(th)}$, the switching transistor M1 is turned on and shifts to the section $T_C$. In the section $T_C$, the influence of the mirror effect is eliminated, and the gate capacitance of the switching transistor M1 is charged by the drive circuit 220. After the section $T_C$, the drive current $I_{LED}$ flows through the third light emitting unit U3 and the second light emitting unit U2, and the light distribution of a low beam is formed. The output voltage $V_{OUT}$ of the constant-current driver 210 at this time is $3 \times V_F$, which is less than a voltage ($4 \times V_F$) necessary for lighting the first light emitting unit U1, so that the first light emitting unit U1 is not lit.

At the time $t_1$, the switching signal Hi/Lo changes to a state of indicating the first function (high beam). In response to this, the drive circuit 220 causes the gate signal $V_G$ of the switching transistor M1 to transition to low.

A turn-off operation period (turn-off period) $T_{OFF}$ of the switching transistor M1 includes three sections $T_B$, $T_E$, and $T_F$. In the section $T_D$, the gate capacitance of the switching transistor M1 is discharged by the drive circuit 220, and the gate voltage $V_G$ of the switching transistor M1 decreases. In this section $I_D$, the switching transistor M1 is still kept on, and the second light emitting unit U2 is lit.

When the gate voltage $V_G$ decreases to the vicinity of the gate-source threshold voltage $V_{GS(th)}$ of the switching transistor M1, the time enters into the section $T_E$. In the section $T_E$, a drain voltage $V_D$ of the switching transistor M1 decreases in addition to the gate voltage $V_G$, but the decrease rate of the gate voltage $V_G$ becomes very slow due to the mirror effect caused by the capacitor C1.

In the section $T_E$, the switching transistor M1 is slowly turned off. As a result, the current flowing through the second light emitting unit U2 gradually decreases with time, whereas the current flowing through the first light emitting unit U1 increases with time. At this time, the output voltage $V_{out}$ slowly rises from $3 \times V_F$ to $4 \times V_F$.

When the gate voltage $V_G$ falls below the threshold voltage $V_{GS(th)}$, the switching transistor M1 is turned off and shifts to the section $T_F$. In the section $T_F$, the influence of the mirror effect is eliminated, and the gate capacitance of the switching transistor M1 is discharged by the drive circuit 220. After the section $T_F$, the drive current $I_{LED}$ flows through the third light emitting unit U3 and the first light emitting unit U1, and the light distribution of a high beam is formed.

At the time $t_2$, the switching signal Hi/Lo changes to a state of indicating the second function (low beam). In response to this, the drive circuit 220 causes the gate signal $V_G$ of the switching transistor M1 to transition to high.

The turn-on operation of the switching transistor M1 is similar to the turn-on operation immediately after the time $t_0$, and includes three sections $T_A$, $T_B$, and $T_C$.

In the section $T_B$, the switching transistor M1 is slowly turned on. As a result, the current flowing through the second light emitting unit U2 gradually increases with time, whereas the current flowing through the first light emitting unit U1 decreases with time. At this time, the output voltage $V_{OUT}$ slowly decreases from $4 \times V_F$ to $3 \times V_F$.

The operation of the light source module 100A has been described above.

Advantages of the light source module 100A are clarified by comparison with a comparative technique.

(1) In the comparative technique, switching from low beam to high beam and switching from high beam to low beam is instantaneously performed. In the comparative technique, since switching between high beam and low beam occurs in a short time, the brightness of the field of view of the driver is partially steeply changed, which may cause the driver to feel uncomfortable.

On the other hand, the light source module 100A allows both the high beam and the low beam to be lit using the period $T_E$ when the low beam is switched to the high beam. Similarly, the light source module 100A allows both the high beam and the low beam to be lit using the period $T_B$ when the high beam is switched to the low beam. As a result, the discomfort given to the driver can be reduced as compared with the comparative technique.

(2) In the comparative technique, when the low beam is switched to the high beam, it is necessary to increase the output voltage $V_{OUT}$ from $4 \times V_F$ to $3 \times V_F$ at a high speed, but it is not easy to design such a constant-current driver 210, and this causes an increase in cost. When the response speed of the constant-current driver 210 is slow, there is a problem in that the output voltage $V_{OUT}$ is insufficient to $4 \times V_F$ and both the low beam and the high beam are unlit.

In the light source module 100A, when the low beam is switched to the high beam at the time $t_1$, the drive current $I_{LED}$ flows while slowly switching from the second light emitting unit U2 for the low beam to the first light emitting unit U1 for the high beam during the period $T_E$. As a result, the rising speed of the output voltage $V_{OUT}$ can be reduced, which can solve the problem of simultaneous lighting-out of the low beam and the high beam. In addition, the response speed required for the constant-current driver 210 can be reduced, the design is facilitated, and the cost can be reduced.

(3) In the comparative technique, when the high beam is switched to the low beam, it is necessary to decrease the output voltage $V_{OUT}$ from $4 \times V_F$ to $3 \times V_F$ at a high speed. When the response speed of the constant-current driver 210 is slow, the charge amount $Q = V_F \times C_{OUT}$ proportional to the voltage difference ($4V_F - 3V_F$) flows into the light source 110, which may cause an overcurrent. The $C_{OUT}$ is a smoothing capacitor provided at the output stage of the constant-current driver 210.

On the other hand, in the light source module 100A, when the high beam is switched to the low beam at the time $t_2$, the drive current $I_{LED}$ flows while slowly switching from the first light emitting unit U1 for the high beam to the second light emitting unit U2 for the low beam during the period $T_B$. As a result, the decrease rate of the output voltage $V_{OUT}$ is reduced, and the overcurrent can be suppressed. In addition, the response speed required for the constant-current driver 210 can be reduced, the design is facilitated, and the cost can be reduced.

(4) In addition, the light source module 100A allows switching between high beam and low beam to be realized by one switching transistor M1. This can reduce the cost of the lighting circuit 200A.

(5) Moreover, a capacitor is connected between the gate and the drain of the switching transistor M1, and the turn-on time and the turn-off time are extended by the mirror effect. This can reduce the capacitance required to generate the same delay time, as compared with a case where a capacitor is connected between the gate and the source. When the capacitor C1 is integrated into an IC, the chip size can be reduced.

(6) In addition, when the capacitor C1 is connected between the gate and the source, all of the sections $T_A$, $T_B$, and $T_C$ ($T_D$, $T_E$, $T_F$) change depending on the capacitor C1, which makes it difficult to make a design. On the other hand, when the capacitor C1 is connected between the gate and the drain, the capacitor C1 greatly affects the section $T_B$ ($T_E$), but hardly affects $T_A$ and $T_C$ ($T_D$, $T_F$), which makes it easy to design the turn-on time $T_{ON}$ and the turn-off time $T_{OFF}$.

When the constant-current driver 210 becomes operable during the turn-on time $T_{ON}$ immediately after the time $t_0$, the drive current $I_{LED}$ generated by the constant-current driver 210 flows to the first light emitting unit U1 side, which lights the high beam. In order to prevent this, the startup time of the constant-current driver 210 is preferably longer than the turn-on time $T_{ON}$. Alternatively, the output current $I_{OUT}$ of the constant-current driver 210 is preferably cut off during the turn-on time $T_{ON}$.

The drive circuit 220 may be structured such that the turn-off time $T_{OFF}$ of the switching transistor M1 is longer than the turn-on time $T_{ON}$.

Figure 4A:
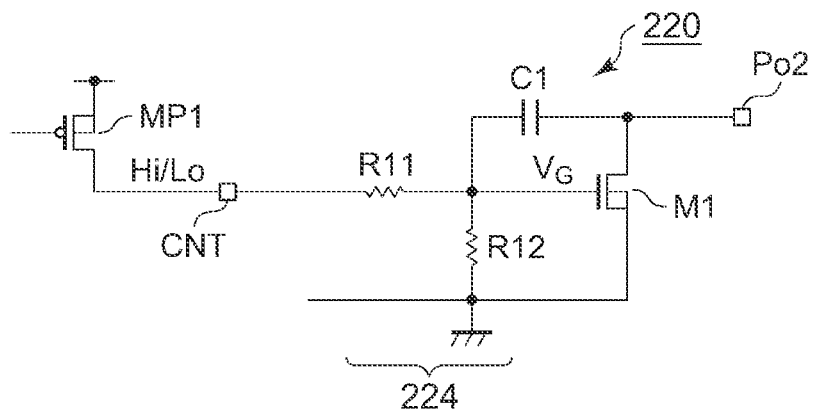
FIGS. 4A to 4C are circuit diagrams illustrating a configuration example of a drive circuit.
Figure 4B:
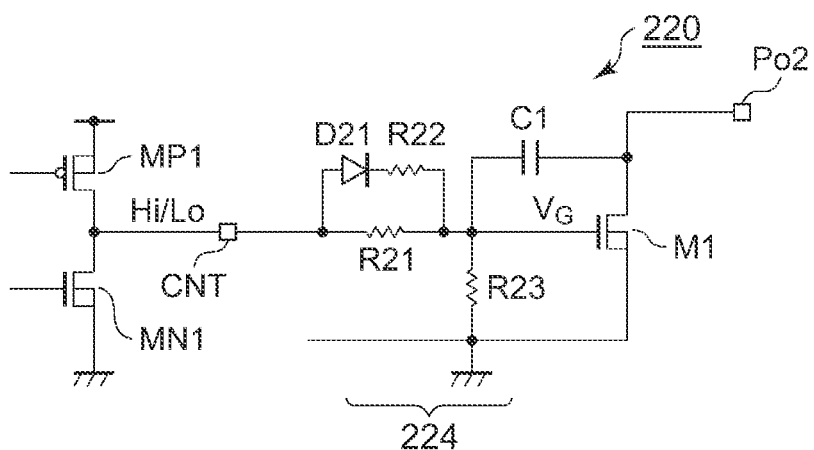
Figure 4C:
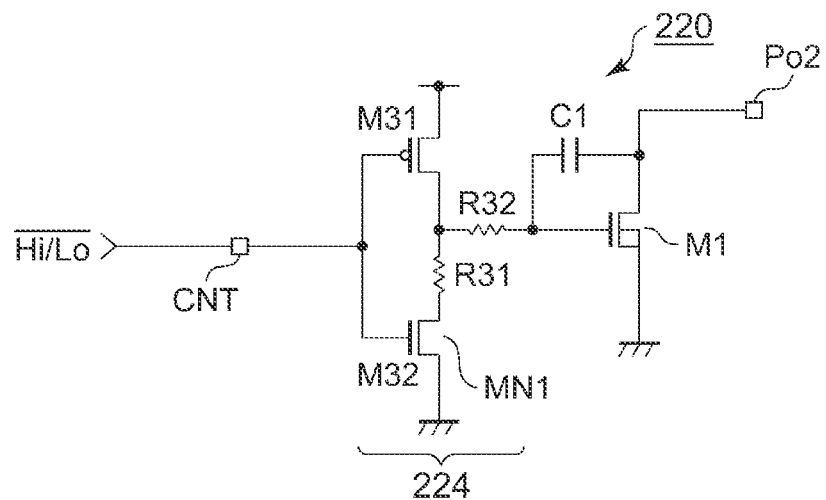

FIGS. 4A to 4C are circuit diagrams illustrating a configuration example of the drive circuit 220. In FIG. 4A, the switching signal Hi/Lo changes in two states of high and high impedance. For example, the output stage of the vehicle-side ECU 6 may include an open-drain PMOS transistor MP1. The off state of the PMOS transistor MP1 corresponds to a high beam lighting instruction, and the on state corresponds to a low beam lighting instruction.

The drive signal generation circuit 224 includes resistors R11 and R12. The first resistor R11 is provided between the gate of the switching transistor M1 and the control terminal CNT. The second resistor R12 is provided between the gate of the switching transistor M1 and the ground.

When the PMOS transistor MP1 is turned on, the gate of the switching transistor M1 is charged via the resistor R11, and the gate voltage $V_G$ increases. When the PMOS transistor MP1 is turned off, the gate of the switching transistor M1 is discharged via the resistor R12, and the gate voltage $V_G$ increases. When it is desired to make the turn-off time $T_{OFF}$ longer than the turn-on time $T_{ON}$, it suffices if R12>R11.

In FIG. 4B, the switching signal Hi/Lo can be switched between two states of high and low. For example, the output stage of the vehicle-side ECU 6 includes a CMOS inverter. The on state of an NMOS transistor MN1 corresponds to a high beam lighting instruction, and the on state of a PMOS transistor MP1 corresponds to a low beam lighting instruction.

The drive signal generation circuit 224 includes resistors R21, R22, and R23, and a rectifier element D21. The first resistor R21 is provided between the control terminal CNT and the gate of the switching transistor M1. The second resistor R22 and the rectifier element D21 are provided in series on a path parallel to the first resistor R21.

When the PMOS transistor MP1 is turned on, the gate of the switching transistor M1 is charged via a parallel connection circuit of the resistors R21 and R22, and the gate voltage $V_G$ increases. When the NMOS transistor MN1 is turned on, the gate of the switching transistor M1 is discharged via the resistor R22 (and the resistor R23), and the gate voltage $V_G$ decreases.

In FIG. 4C, a switching signal YHi/Lo (Y represents inversion logic) is inverted from that in FIG. 4B. The drive signal generation circuit 224 includes transistors M31 and M32 and resistors R31 and R32.

When the switching signal YHi/Lo is low, the gate of the switching transistor M1 is charged via the transistor M31 and the resistor R32, and the gate voltage $V_G$ increases. When the switching signal YHi/Lo is high, the gate of the switching transistor M1 is charged via the transistor M32 and the resistors R31 and R32, and the gate voltage $V_G$ decreases.

Second Embodiment

Figure 5:
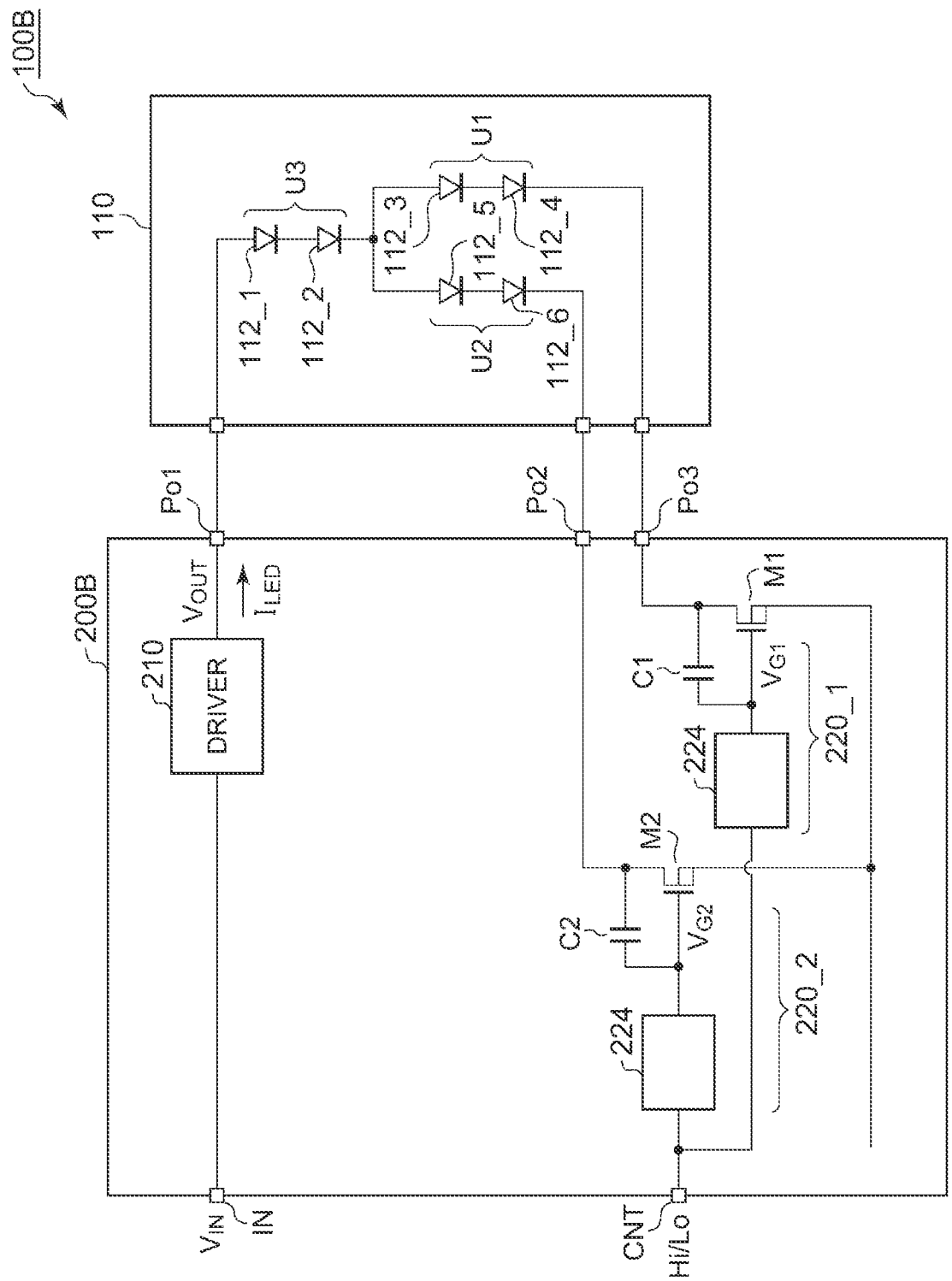
FIG. 5 is a block diagram of a light source module according to a second embodiment.

FIG. 5 is a block diagram of a light source module 100B according to a second embodiment. Differences of the configuration of the light source module 100B from the light source module 100A in FIG. 2 will be described.

Both a first light emitting unit U1 and a second light emitting unit U2 include S light emitting elements. A first function may be high beam, and a second function may be low beam. S is 2 in FIG. 5, but S may be 1 or may be 3 or more.

A lighting circuit 200B includes a constant-current driver 210, a first switching transistor M1, a second switching transistor M2, a first drive circuit 220_1, and a second drive circuit 220_2. The first drive circuit 220_1 includes a first capacitor C1 provided between the gate and the drain of the first switching transistor M1. The first drive circuit 220_1 causes the gate of the first switching transistor M1 to generate a first drive signal $V_{G1}$ according to a switching signal Hi/Lo. Similarly, the second drive circuit 220_2 includes a second capacitor C2 provided between the gate and the drain of the second switching transistor M2. The second drive circuit 220_2 causes the gate of the second switching transistor M2 to generate a second drive signal $V_{G2}$ according to the switching signal Hi/Lo. The first drive signal $V_{G1}$ and the second drive signal $V_{G2}$ have a complementary relationship.

The configuration of the light source module 100B has been described above. Next, an operation of light source module 100B will be described.

When the switching signal Hi/Lo indicates the high beam, the first switching transistor M1 is turned on and the second switching transistor M2 is turned off, which causes a drive current $I_{LED}$ to flow through a third light emitting unit U3 and the first light emitting unit U1 to form the light distribution of the high beam.

When the switching signal Hi/Lo indicates the low beam, the first switching transistor M1 is turned off and the second switching transistor M2 is turned on, which causes the drive current $I_{LED}$ to flow through the third light emitting unit U3 and the second light emitting unit U2 to form the light distribution of the low beam.

At the time of switching between the high beam and the low beam, the first drive voltage $V_{G1}$ and the second drive voltage $V_{G2}$ gradually change due to the mirror effect. As a result, when switching is performed, the high beam and the low beam can be lit in a temporally overlapping manner.

The embodiments described above are intended to be illustrative only, and It will be understood by those skilled in the art that various modifications can be made to combinations of their components and processing processes. Hereinafter, such modifications will be described.

First Modification Example

In the first and second embodiments, the constant-current driver 210 is configured with a current source type, but may be configured with a current sink type. In this case, the lighting circuit 200A and the lighting circuit 200B may be inverted by configuring the transistors M1 and M2 with PMOS transistors or PNP bipolar transistors.

Second Modification Example

The first function may be a daytime running lamp, and the second function may be a clearance lamp.

Third Modification Example

The number of light emitting elements included in each of the first light emitting unit U1, the second light emitting unit U2, and the third light emitting unit U3 is not particularly limited. In addition, the third light emitting unit U3 may be omitted.

The embodiments are intended to be illustrative only, and it will be understood by those skilled in the art that various modifications exist in combinations of their components and processing processes and that such modifications are also included in the scope of the present disclosure or the present invention.

What is claimed is:

1. A light source module capable of switching between a first function and a second function according to a switching signal, the light source module comprising:
    a first light emitting unit including M (M≥2) first light emitting elements provided in series;
    a second light emitting unit including N (N<M) second light emitting elements and a switching transistor having a drain or a collector connected to the second light emitting unit, wherein the second light emitting unit and the switching transistor are provided on a path parallel to the first light emitting unit;
    a constant-current driver connected in series to the first light emitting unit and in series to the second light emitting unit and has a constant-current output for generating a drive current; and
    a drive circuit including a capacitor provided between a gate and a drain or between a base and a collector of the switching transistor and structured to generate a drive signal at the gate or the base of the switching transistor according to the switching signal, wherein
    the switching signal is switchable between two states of high-level and high impedance, and
    the drive circuit includes:
    a first resistor provided between a control terminal to which the switching signal is input and the gate or the base of the switching transistor, and
    a second resistor provided between the gate and a source or between the base and an emitter of the switching transistor.

2. The light source module according to claim 1, wherein the drive circuit is structured such that a turn-off time of the switching transistor is longer than a turn-on time of the switching transistor.

3. A light source module capable of switching between a first function and a second function according to a switching signal, the light source module comprising:
    a first light emitting unit including M (M≥2) first light emitting elements provided in series;
    a second light emitting unit including N (N<M) second light emitting elements and a switching transistor having a drain or a collector connected to the second light emitting unit, wherein the second light emitting unit and the switching transistor are provided on a path parallel to the first light emitting unit;
    a constant-current driver connected in series to the first light emitting unit and in series to the second light emitting unit and has a constant-current output for generating a drive current; and
    a drive circuit including a capacitor provided between a gate and a drain or between a base and a collector of the switching transistor and structured to generate a drive signal at the gate or the base of the switching transistor according to the switching signal, wherein
    the switching signal is switchable between two states of high-level and low-level, and
    the drive circuit includes:
    a first resistor provided between a control terminal to which the switching signal is input and the gate or the base of the switching transistor, and
    a rectifier element and a second resistor provided in series on a path parallel to the first resistor.

4. A light source module capable of switching between a first function and a second function according to a switching signal, the light source module comprising:
    a first light emitting unit including S (S≥1) first light emitting elements and a first switching transistor having a drain or a collector connected to the first light emitting unit, wherein the first light emitting unit and the first switching transistor are provided on a first path;
    a second light emitting unit including S second light emitting elements and a second switching transistor having a drain or a collector connected to the second light emitting unit, wherein the second light emitting unit and the second switching transistor are provided on a second path parallel to the first path;
    a constant-current driver connected in series to the first path and in series to the second path and having a constant-current output for generating a drive current;
    a first drive circuit including a first capacitor provided between a gate and a drain or between a base and a collector of the first switching transistor and structured to generate a first drive signal at the gate or the base of the first switching transistor according to the switching signal; and
    a second drive circuit including a second capacitor provided between a gate and a drain or between a base and a collector of the second switching transistor and structured to generate a second drive signal at the gate or the base of the second switching transistor according to the switching signal.

5. The light source module according to claim 4, wherein the first drive circuit is structured such that a turn-off time of the first switching transistor is longer than a turn-on time of the first switching transistor, and
    the second drive circuit is structured such that a turn-off time of the second switching transistor is longer than a turn-on time of the second switching transistor.

6. The light source module according to claim 4, wherein the switching signal is switchable between two states of high-level and high impedance, and the first drive circuit and the second drive circuit each
include:
a first resistor provided between a control terminal to
which the switching signal is input and the gate or the
base of the switching transistor to be driven, and
a second resistor provided between the gate and a source
or between the base and an emitter of the switching
transistor to be driven.

7. The light source module according to claim 4, wherein
the switching signal is switchable between two states of
high-level and low-level, and
the first drive circuit and the second drive circuit include:
a first resistor provided between a control terminal to
which the switching signal is input and the gate or the
base of the switching transistor, and
a rectifier element and a second resistor provided in series
on a path parallel to the first resistor.

8. The light source module according to claim 1, further
comprising a third light emitting unit including at least one
third light emitting element provided on a path in series with
both the first light emitting unit and the second light emitting
unit.

9. The light source module according to claim 1, wherein
the first function is a high beam, and the second function is
a low beam.

10. The light source module according to claim 1, wherein
the first function is a daytime running lamp, and the second
function is a clearance lamp.

11. A lighting circuit that is used in a light source module
capable of switching between a first function and a second
function according to a switching signal and that drives a
light source,
the light source comprising:
S (S≥1) first light emitting elements provided on a first
path; and
S second light emitting elements provided on a second
path parallel to the first path,
the lighting circuit comprising:
a first connection terminal connected to a cathode of the
S first light emitting elements;
a second connection terminal connected to a cathode of
the S second light emitting elements;
a first switching transistor provided between the first
connection terminal and a ground line;
a second switching transistor provided between the second connection terminal and the ground line;
a constant-current driver connected in series to the first
path and in series to the second path and that has a
constant-current output for generating a drive current;
a first drive circuit including a first capacitor provided
between a control electrode of the first switching transistor and the first connection terminal and structured to
supply a first drive signal according to the switching
signal to the control electrode of the first switching
transistor; and
a second drive circuit including a second capacitor provided between a control electrode of the second switching transistor and the second connection terminal and
structure to supply a second drive signal according to
the switching signal to the control electrode of the
second switching transistor.

\* \* \* \* \*